United States Patent Office.

CHARLES ABRESCH, OF NEW YORK, N. Y.

Letters Patent No. 97,143, dated November 23, 1869.

IMPROVED PROCESS OF BREWING BEER.

The Schedule referred to in these Letters Patent and making part of the same

*To all whom it may concern:*

Be it known that I, CHARLES ABRESCH, of the city, county, and State of New York, have invented a new and improved Process for Brewing Beer; and I do hereby declare the following to be a full, clear, and exact description thereof, which will enable those skilled in the art to make and use the same.

This invention relates to a process for producing what I call "Pilsener Rice-Beer," which is produced by mixing, with the ordinary barley malt, one-quarter of rice, in the following manner:

I take about one-third of the requisite quantity of water, and heat it in the copper to the boiling-point, while the remaining two-thirds of the water are mixed with the ordinary barley-malt in the mash-tun.

I then raise the temperature of the first mash in the mash-tun to about 95° Fahrenheit, and take a thick mash, by bringing about one-third of the mash into the copper, where it is heated to about 95° or 100°, when the rice is added, and the whole gradually heated for the term of two hours, until it reaches the boiling-point, so that by the diastase the rice is completely dissolved, and the transformation of the starch into sugar is effected.

The mash thus obtained is returned to the mash-tun, and thereby the temperature of the mass in the mash-tun is raised to about 118° or 122°; then the second thick mash is prepared, by bringing one-third of the mass into the copper, where it is again heated to the boiling-point, as quick as possible, when it is returned to the mash-tun, whereby the temperature therein is raised to about 145° or 150°; then the clear wort is pumped up into the copper, and again boiled, and returned to the mash-tun, whereby the temperature therein is raised to 167° or 175°, and after that the mass is left standing for about an hour, and then the clear wort is drained off, and the residuum is sprinkled with boiling water or liquor, in four intervals, and the sparges thus obtained are mixed with the wort, the fourth sparge being thereby reduced to from one and one-half to two per centum, according to the sancha-rometer of Kaiser.

Finally, the hops are added, in three instalments, two-sixths at the first boiling, three-sixths a short time before drawing off the wort, and one-sixth on the hop-screen, whereby the lupuline is extracted from the hops.

The liquid thus obtained is then cooled, and left to ferment in the ordinary manner, but it is desirable to strengthen the effect of the fermenting-substance, by a liquid extract of hops, and by malt-flour.

Instead of rice, ground starch may be used in the same proportion, and without changing the process.

My process may be somewhat modified, by taking, after the first mash, two-thirds of thick mash into the copper, instead of one-third, as above stated, and thereby the temperature of the second mash will be raised at once to from 145° to 150°, instead of 118° to 122°, and thus the preparation of the clear wort can be immediately proceeded with, as above described.

What I claim as new, and desire to secure by Letters Patent, is—

The within-described process for brewing beer, by mixing barley-malt with rice or ground starch, about in the proportion above stated, and treating the mixture substantially in the manner herein set forth.

CHARLES ABRESCH.

Witnesses:
W. HAUFF,
C. WAHLERS.